United States Patent
Stillman et al.

(10) Patent No.: US 7,996,481 B2
(45) Date of Patent: Aug. 9, 2011

(54) OUTBOUND NOTIFICATION USING CUSTOMER PROFILE INFORMATION

(75) Inventors: Scott T. Stillman, Peachtree City, GA (US); John Jeffrey Decker, Decatur, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1041 days.

(21) Appl. No.: 10/393,130

(22) Filed: Mar. 20, 2003

(65) Prior Publication Data

US 2004/0003048 A1    Jan. 1, 2004

(51) Int. Cl.
    *G06F 15/16* (2006.01)
(52) U.S. Cl. .......................... 709/207; 709/223
(58) Field of Classification Search .................. 709/200, 709/223–224, 207–211
See application file for complete search history.

(56) References Cited

U.S. PATENT DOCUMENTS

| | | | | |
|---|---|---|---|---|
| 5,828,674 A * | 10/1998 | Proskauer | ..................... | 714/724 |
| 5,880,770 A * | 3/1999 | Ilcisin et al. | ............... | 348/14.06 |
| 5,903,845 A * | 5/1999 | Buhrmann et al. | ............ | 455/461 |
| 5,917,449 A * | 6/1999 | Sanderford et al. | ........... | 342/457 |
| 5,933,778 A * | 8/1999 | Buhrmann et al. | ............ | 455/461 |
| 6,021,761 A * | 2/2000 | Kellner et al. | ................. | 123/495 |
| 6,094,681 A * | 7/2000 | Shaffer et al. | .................. | 709/224 |
| 6,154,527 A * | 11/2000 | Porter et al. | ................ | 379/88.18 |
| 6,177,873 B1 * | 1/2001 | Cragun | .......................... | 340/601 |
| 6,295,346 B1 * | 9/2001 | Markowitz et al. | ....... | 379/127.01 |
| 6,373,817 B1 * | 4/2002 | Kung et al. | .................... | 370/217 |
| 6,480,830 B1 * | 11/2002 | Ford et al. | .......................... | 705/9 |
| 6,490,525 B2 * | 12/2002 | Baron et al. | ....................... | 702/3 |
| 6,493,633 B2 * | 12/2002 | Baron et al. | ....................... | 702/3 |
| 6,523,038 B1 * | 2/2003 | Iida et al. | ............................... | 1/1 |
| 6,564,210 B1 * | 5/2003 | Korda et al. | ........................... | 1/1 |
| 6,594,345 B1 * | 7/2003 | Vinson | ............................. | 379/48 |
| 6,823,263 B1 * | 11/2004 | Kelly et al. | ....................... | 702/3 |
| 6,823,357 B1 * | 11/2004 | Du et al. | ........................ | 709/203 |
| 6,883,019 B1 * | 4/2005 | Sengupta et al. | ............. | 709/206 |
| 7,031,700 B1 * | 4/2006 | Weaver et al. | ................. | 455/420 |
| 7,212,829 B1 * | 5/2007 | Lau et al. | .................... | 455/456.1 |
| 2001/0043687 A1 * | 11/2001 | Tidwell et al. | ........... | 379/110.01 |
| 2001/0055963 A1 * | 12/2001 | Cloutier | ......................... | 455/417 |
| 2002/0067338 A1 * | 6/2002 | Adan et al. | ...................... | 345/156 |
| 2002/0072039 A1 * | 6/2002 | Rtischev et al. | .............. | 434/157 |
| 2002/0107905 A1 * | 8/2002 | Roe et al. | ........................ | 709/202 |
| 2002/0115453 A1 * | 8/2002 | Poulin et al. | ................... | 455/456 |
| 2002/0188522 A1 * | 12/2002 | McCall et al. | ................... | 705/26 |
| 2003/0103608 A1 * | 6/2003 | Pearson et al. | ............. | 379/88.18 |
| 2003/0154242 A1 * | 8/2003 | Hayes et al. | ................... | 709/203 |
| 2003/0194065 A1 * | 10/2003 | Langseth et al. | ........... | 379/88.18 |

(Continued)

OTHER PUBLICATIONS

Portable Translator IBM technical disclosure Bulletin Nov. 1994.*

*Primary Examiner* — William C Vaughn, Jr.
*Assistant Examiner* — Ninos Donabed
(74) *Attorney, Agent, or Firm* — Woodcock Washburn LLP (57) ABSTRACT

Methods and systems provide for automatic outbound information notification to a subscriber based on a subscriber's communications customer profile. A subscriber may select one or more events for which the subscriber desires notification from an outbound notification events options list. When an event is triggered for which the subscriber has requested notification, for example a traffic information report at a selected notification time, a voice services node queries a customer profile database to determine what information must be obtained and transmitted to the subscriber based on the subscriber's selected notification options and frequencies. The voice services node calls the subscriber at the subscriber's telephone directory number and plays the prescribed event information to the subscriber.

46 Claims, 4 Drawing Sheets

U.S. PATENT DOCUMENTS

| | | | |
|---|---|---|---|
| 2003/0211845 A1* | 11/2003 | Lohtia et al. | 455/414.3 |
| 2004/0028208 A1* | 2/2004 | Carnazza et al. | 379/221.01 |
| 2004/0216098 A1* | 10/2004 | Roe et al. | 717/161 |
| 2004/0248570 A1* | 12/2004 | Denenberg et al. | 455/432.3 |
| 2005/0002510 A1* | 1/2005 | Elsey et al. | 379/201.01 |
| 2005/0013417 A1* | 1/2005 | Zimmers et al. | 379/37 |
| 2005/0036593 A1* | 2/2005 | Zirngibl et al. | 379/88.17 |
| 2005/0058124 A1* | 3/2005 | Helferich | 370/352 |
| 2005/0154531 A1* | 7/2005 | Kelly et al. | 702/3 |
| 2005/0210376 A1* | 9/2005 | Zirngibl et al. | 715/513 |
| 2006/0195591 A1* | 8/2006 | Kim et al. | 709/227 |
| 2008/0189388 A1* | 8/2008 | Khare et al. | 709/217 |

* cited by examiner

OUTBOUND NOTIFICATION USING CUSTOMER PROFILE INFORMATION

FIELD OF THE INVENTION

This invention relates to methods and systems for providing automatic outbound information notification to a subscriber based on a subscriber's communications customer profile.

BACKGROUND OF THE INVENTION

With the advent of modern telecommunications systems, a variety of voice portal services are available to users where users may call into a voice interactive service to receive a variety of useful information. For example, a user may dial a sports information number to receive the latest sports headlines. A user may dial a traffic and weather information number to receive traffic and weather information for a selected area. The user may dial a stock quote information line and receive stock quotes and other helpful financial information for a selected company or other business.

Unfortunately, with such systems, the user must initiate contact with the service to receive the information. If an important event occurs, the user will not learn of the event unless the user places a call to the service to obtain information related to the event. For example, if a traffic accident occurs in the user's local driving area, the user will not learn of the problem unless the user places a call to the traffic information service to obtain the information. If the user needs information on a regular or periodic basis, such as news headlines or stock quotes, the user must remember to contact the appropriate information service on a regular or periodic basis.

It is with respect to these and other considerations that the present invention has been made.

SUMMARY OF THE INVENTION

Embodiments of the present invention solve the above and other problems by providing methods and systems for automatic outbound information notification to a subscriber based on a subscriber's communications customer profile. Generally described, a subscriber of telecommunications services accesses a customer profile database established for the subscriber. According to one aspect of the invention, the subscriber may request outbound notification events options to review a list of events for which outbound notification information may be sent to the subscriber. The subscriber may access the customer profile database via a voice services node where the subscriber may interact with the voice services node via a voice interactive session with the voice services node. Alternatively, the subscriber may access the customer profile database electronically via an Internet-based web page where the subscriber may review and select outbound notification events options.

The subscriber may select from the outbound notification events options one or more events for which the subscriber desires notification. The subscriber may also select a frequency of notification. For example, the subscriber may select that traffic information for the subscriber's local driving area each day at 5:00 pm should be transmitted to the subscriber via a text-to-speech translation or via a preformatted audio file played to the user via a telephone call placed by the voice services node to the subscriber. The subscriber's selected notification options and notification frequency is saved to the subscriber's customer profile in the customer profile database.

When an event is triggered for which the subscriber has requested notification, for example a traffic information report at a selected notification time, the voice services node queries the customer profile database to determine what information must be obtained and transmitted to the subscriber based on the subscriber's selected notification options and frequencies. If required, a query to an information resource provider is made to obtain the required event information. For example, a query may be transmitted to a traffic information server via the Internet to request traffic information for the subscriber's local driving area at the time selected by the subscriber. The information obtained from the information resource provider is passed to the voice services node, and the voice services node converts the information from text to speech for transmitting to the subscriber. Alternatively, the information obtained from the information resource provider may be in the form of a preformatted audio file that may be played to the subscriber.

The voice services node then calls the subscriber at the subscriber's telephone directory number and plays the obtained event information to the subscriber. If desired, prior to placing the call to the subscriber, the voice services node may check the subscriber's customer profile at the customer profile database to determine via the subscriber's personal calendar whether the subscriber must be called at an alternate directory number. If so, the voice services node may call the subscriber via the alternate directory number to provide the subscriber with the obtained event information. After the obtained event information is provided to the subscriber, the call from the voice services node to the subscriber is terminated.

These and other features, advantages and aspects of the present invention may be more clearly understood and appreciated from a review of the following detailed description of the disclosed embodiments and by reference to the appended drawings and claims.

DETAILED DESCRIPTION OF THE PREFERRED EMBODIMENT

As briefly described above, embodiments of the present invention provide methods and systems for providing automatic outbound information notification to a subscriber based on a subscriber's communications customer profile. These embodiments may be combined, other embodiments may be utilized, and structural changes may be made without departing from the spirit and scope of the present invention. The following detailed description is, therefore, not to be taken in a limiting sense, and the scope of the present invention is defined by the pending claims and their equivalents. Referring now to the drawings, in which like numerals refer to like components or elements throughout the several figures, aspects of the present invention and an exemplary operating environment will be described.

Figure 1:
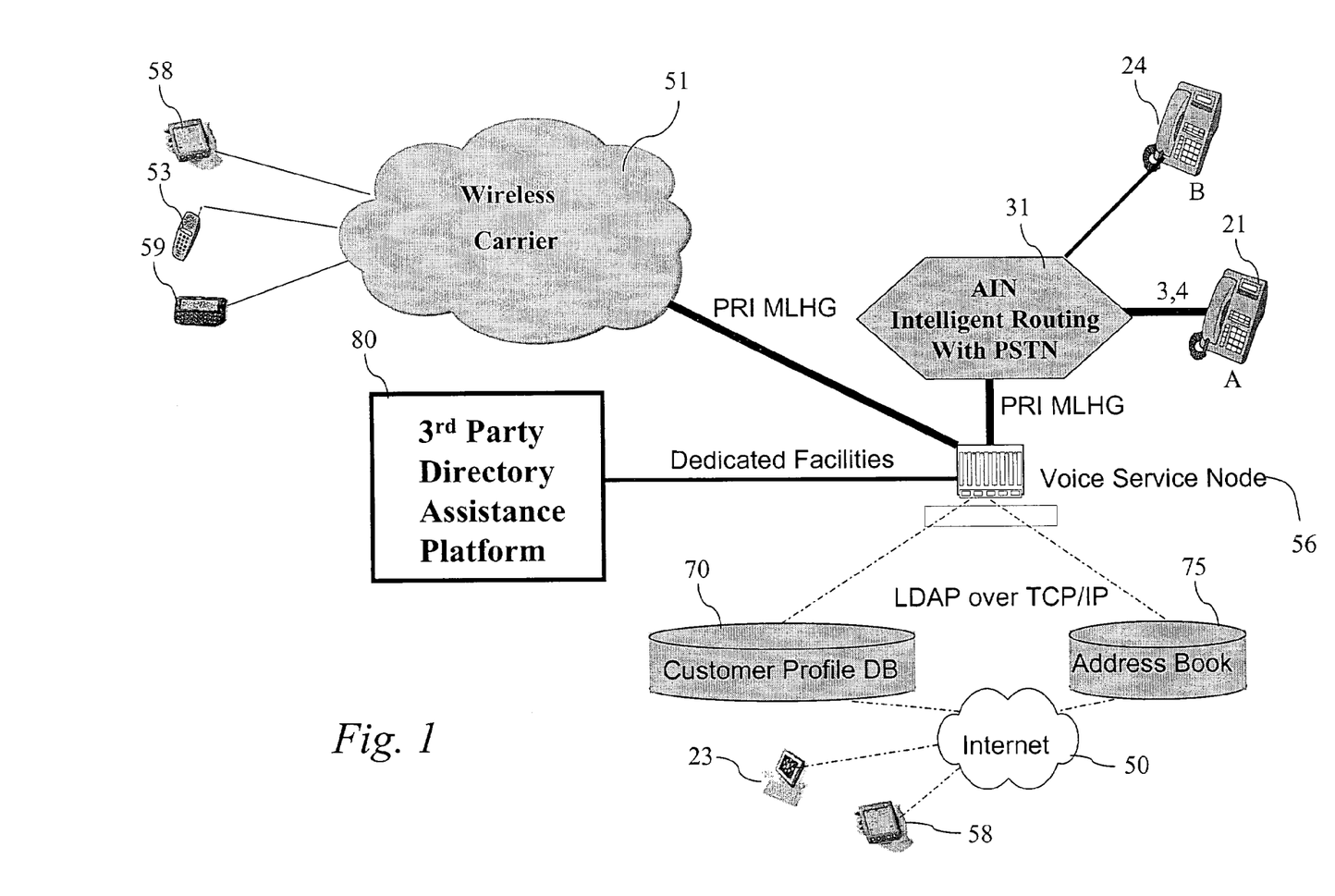
FIG. 1 is a simplified block diagram illustrating components of a wireline and wireless communications network and illustrating interaction between a voice services node and a customer profile database and subscriber address book.

FIG. 1 is a simplified block diagram illustrating components of a wireline and wireless communications network and illustrating interaction between a voice services node and a customer profile database and subscriber address book. According to an embodiment of the present invention, a subscriber accesses his/her customer profile at the customer profile database 70 of his/her telecommunications service provider to request outbound information notification for selected events. The subscriber may access the customer profile via the voice services node by dialing an access number from the subscriber's wireline telephone 21, 24 via the public switched telephone network 31. Alternatively, the subscriber may dial the voice services node for access to the customer profile via the subscriber's wireless telephone 53 through the wireless network 51. Alternatively, the subscriber may request access to his/her customer profile via the Internet 50 from the subscriber's computer 23 or personal digital assistant 58. Alternatively, the subscriber may access and update his/her customer profile via a personal digital assistant 58, 59 through the wireless network 51.

Once the subscriber accesses her customer profile, the voice services node 56, or alternatively, an Internet-based web server (FIG. 2) may provide the subscriber with outbound notification options. For example, the subscriber may select an option to have weather and traffic information for the subscriber's local driving area transmitted to the subscriber each workday at 5:00 pm. Options selected by the subscriber are saved to the subscriber's customer profile in the database 70. Subsequently, a software application resident at the voice services node 56 monitors or tracks on a date and time basis events selected by the subscriber. When a date and/or time for a selected event occurs, the voice services node queries the customer profile database 70 to determine what event the subscriber has selected for the event occurrence (selected date and time period). For example, the customer profile may return to the voice services node information indicating that at the current date and/or time, traffic and weather information should be transmitted to the subscriber for the subscriber's local driving area.

Once the appropriate event is identified, the voice services node 56 queries an information resource provider for the information to be provided to the subscriber. For example, the voice services node 56 may query a local or Internet-based server for obtaining near real-time or previously downloaded weather/traffic information for the subscriber's local driving area. Once the voice services node obtains the required information, the information is translated from text-to-speech, or alternatively, the voice services node obtains an audio-formatted file containing the required information. The text-to-speech information required by the subscriber, or alternatively, the audio-formatted file containing the information required by the subscriber is passed to the subscriber by the voice services node via a telephone call placed by the voice services node to the subscriber at a previously designated telephone directory number.

Alternatively, if the subscriber maintains a personal calendaring and scheduling profile in the subscriber's customer profile, the voice services node may obtain an alternate telephone directory number associated with the subscriber based on the subscriber's current schedule. For example, if based on the subscriber's current personal calendaring information maintained in the customer profile database 70 it is determined that the subscriber may only be reached via his wireless telephone 53, the voice services node 56 may contact the subscriber via the subscriber's wireless telephone 53 to provide the required information.

Operating Environment

Figure 2:
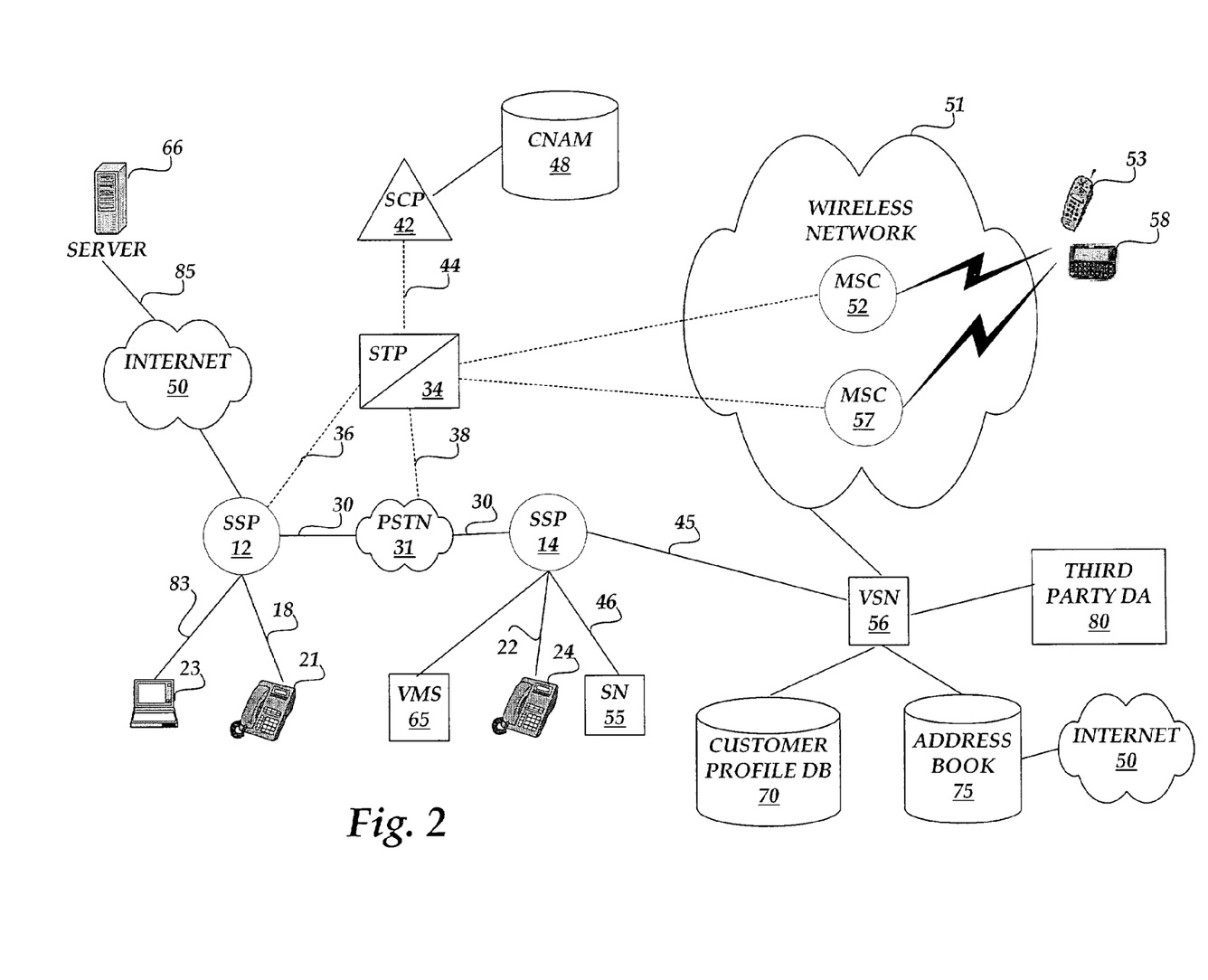
FIG. 2 is a simplified block diagram illustrating components of a wireline and wireless communications network that provides an exemplary operating environment for the present invention.

FIG. 2 is a simplified block diagram illustrating components of a wireline and wireless communications network that provides an exemplary operating environment for the present invention. FIG. 2 and the following description is intended to provide a brief, general description of a suitable operating environment in which the embodiments of the invention may be implemented. While the invention may be described in the general context of software program modules that execute in conjunction with an application program that runs on an operating system of a computer, those skilled in the art will recognize that the invention may also be implemented in a combination of other program modules. Generally, program modules include routines, programs, components, data structures and other types of structures that perform particular tasks or implement particular abstract data types. Moreover, those skilled in the art will appreciate that the invention may be practiced with other telecommunication system and computer system configurations, including hand-held devices, multi-processor systems, multi-processor based or programmable consumer electronics, mini computers, mainframe computers, and the like. The invention may also be practiced in a distributed computing environment where tasks are performed by remote processing devices that are linked through a communications network. In a distributed computing environment, program modules may be located in both local and remote memory sources devices.

The public switched telephone network 31 that evolved in the 1980s incorporated the advanced intelligent network (AIN). Some of the components of the advanced intelligent network are illustrated in FIG. 2. FIG. 2 is illustrative of at least a part of the advanced intelligent network (AIN) 100 of a typical local exchange carrier integrated with components of a wireless network 51. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices is provided in a typical public switched telephone network. As shown in FIG. 2, each central office may include an electronic switch known to those skilled in the art as a service switching point (SSP). These are indicated in FIG. 2 as SSP switches 12 and 14. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 30.

As shown in FIG. 2, switches (SSP) 12 and 14 have a plurality of subscriber lines 18 and 20 connected thereto. Each of the subscriber lines 18 and 20 is connected to a terminating piece or pieces of customer premises equipment that are represented by telephones 21 and 24. A computer 23 also is illustrated as connected to the switch 12 via the subscriber line or CTI 83. The computer 23 is illustrative of a single or a plurality of computing and data storage devices. SSP switches 12 and 14 are connected by a plurality of trunk circuits 30. These are the voice path trunks that interconnect the central offices 12 and 14 and over which calls are connected when completed.

Each piece of terminating equipment in the PSTN 31 is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local service control point (SCP) 42 that is connected to signal transfer point 34 via SS7 data link 44. As is known to those skilled in the art, service control points, such as the SCP 42, are physically implemented by relatively powerful fault tolerant computers. Among the functions performed by the service control points is maintenance of network databases used in providing enhanced services. Service control points, such as SCP 42, normally implement high volume routing services, such as call forwarding and 800 number translation and routing. They are also used for maintenance of and providing access to high volume databases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber.

Additional devices for implementing advanced network functions within the AIN are provided by regional STPs (not shown) and regional SCPs (not shown). The STP 34 is connected to the SSPs via connections 36 and 38. Both the regional SCPs and the local SCP 42, which represent a plurality of local SCPs distributed throughout the AIN, are connected via respective data links to the service management system (not shown). 46 service management systems provide a centralized platform for remotely programming the various SCPs of the AIN so that a coordinated information processing scheme may be implemented for the AIN.

The modern Advanced Intelligent Network also includes service nodes (SN) 55. Those skilled in the art are familiar with service nodes, which are physically implemented by the same types of computers that embody the SCP 42. In addition to the computing capability and data base maintenance features, service nodes 55 use ISDN lines and may include DTMF signal recognition devices, tone generation devices, text to speech (TTS) voice synthesis devices and other voice or data resources. As shown in FIG. 1, the connection is through the SSP. For example, SN 55 is connected to SCP 42 via ISDN links 46 to SSP 14, ISDN/SS7 protocol conversion in SSP 14, and SS7 links 38 and 44. According to a preferred embodiment, the ISDN links 46 serve as a primary rate interface (PRI) over which services may be provided to subscribers using wireline services such as the wireline telephone sets 21 and 24 and subscribers using wireless services such as the wireless units 53, 58.

The voice services node (VSN) 56 performs the same functions as the service node 55, but also includes voice/speech recognition capability for receiving, processing and handling incoming calls based on speech-based information, commands and instructions provided by callers. Voice/speech recognition utilizes speech enabled telephony. In "speech enabled" telephony systems callers may talk, not dial. For example, according to a voice activated dialing system, a caller may speak the words "Call Joe." According to embodiments of the present invention described below, the VSN 56 places a call to the desired called party. Speech enabled telephony makes use of speech recognition and text-to-speech conversion in order to talk to callers. VSNs 56 may find phone numbers, dial them, read a caller her voice and email messages, allow the caller to respond and then send a caller a message over the Internet or over her corporate intranet. Speech enabled telephony allows a subscriber to call the VSN 56 to obtain (hear) information specific for the subscriber.

Voice recognition via the VSN 56 also includes the ability of a machine to recognize a subscriber's voice. Voice recognition includes the ability of a machine to understand human speech particular to a subscriber. Isolated word and phrase recognition is used in which a VSN 56 is trained to recognize a discrete set of command words or phrases and to respond appropriately. Connected word recognition is used in which a VSN 56 is trained on a discrete set of vocabulary words (for example, digits), but is required to recognize fluent sequences of these words such as credit card numbers. Continuous speech recognition is used in which a VSN 56 is trained on a discrete set of subword vocabulary units (e.g., phonemes), but is required to recognize fluent speech.

A speech recognition system usually is made up of an input device, a voice board that provides analog-to-digital conversion of the speech signal, and a signal processing module that takes digitized speech samples and converts them into a series of patterns. These patterns are then compared to a set of stored models that have been constructed from the knowledge of acoustics, language, and dictionaries. The technology may be speaker dependent (trained), speaker adaptive (improves with use), or fully speaker independent. In addition features such as barge-in capability, which allows the user to speak at anytime, and key word spotting, which makes it possible to pick out key words from among a sentence of extraneous words, enable the development of more advanced applications.

According to embodiments of the present invention, the VSN 56 also includes general computing functionality including a computer processor and associated memory for running one or more software applications or software modules described herein and for storing associated data. According to embodiments of the present invention, the VSN 56 is operative to send database queries to the customer profile database 70 and to the address book database 75 via well known data transmission protocols, including TCP/IP. The VSN 56 may receive and process return data from those databases. Additionally, as with the SN 55, the VSN 56 may route calls within the telecommunications network in which the VSN 56 resides, as well as, send and receive calls. The VSN 56 is further operative to send and receive data through a distributed computing network, such as the Internet 50, to a variety of remote data storage mediums and local and remote information resource providers such as may be available at the server 66.

The customer profile data base 70 is a general purpose database. As known to those skilled in the art, a database may be composed of records, each containing fields together with a set of operations for searching, sorting, recombining, and other functions. The customer profile database may include a variety of information for each subscriber such as a subscriber's telephone directory numbers, including business, wireless and personal numbers. The customer profile database 70 may include the subscriber's electronic mail address and a list of services subscribed to by the subscriber such as call forwarding, call waiting and voice mail, etc. The customer profile database may include other personal information such as directions to always forward calls to the subscriber at a specific number on certain days or times. Marketing and advertising information may also be included in a customer profile to be provided to callers to the subscriber.

The address book database 75 is another database that contains information on parties saved at the direction of or for the benefit of a subscriber. For example, in accordance with the present invention, a directory number obtained from directory assistance by a subscriber may then be saved in the subscriber's address book so that the subscriber does not need to use directory assistance the next time the subscriber needs that number. Other information such as a party's physical address, electronic mail address and other helpful information on the party may be saved in the address book database 75.

The directory assistance service 80 is illustrative of any local directory assistance service (provided by the subscriber's telecommunications service provider or third party or of a third party directory assistance service that may be accessed from a number telecommunications networks for obtaining a directory number for a desired called party. Some directory assistance services provide addresses for desired called parties upon request. Directory assistance services are well known to those skilled in the art.

The voice mail system 65 is shown in FIG. 1 being functionally connected to the switch 14 and is a component of the network 100. That is, calls are routed to and from the voice mail system 65 at the control and direction of the network 100 via such components as the SCP 42. The voice mail system 65 typically includes a computer or collection of computers, recording and recording playback devices, and software for recording announcements for incoming calls, recording and playing back recorded messages, and for receiving incoming calls and for making outgoing calls at the direction of the network 100. The voice mail system 65 has memory capacity for saving announcements to incoming callers and for saving messages from incoming callers. The computing system of the voicemail system 65 may send and receive electronic mail via the network 100 and the Internet 70.

A computer telephony interface 83 serves as an interface between the telephone 21 and the computer 23. Computer telephone integration, as facilitated by the computer telephony interface (CTI) 83, is a process for integration of a telephone system with a computing system. For example, the CTI 83 may be used for allowing computer applications to answer incoming calls, provide database information on a computer screen at the same time the call comes in, automatically route and reroute calls, automatically dial and speed dial outgoing calls from a computer resident database and identify incoming customer calls and transfer them to predetermined destinations based on calling party identification received on the incoming telephone call. The computer telephony interface 83 may be a software application program resident on the telephone 21.

The Internet 50 is well known to those skilled in the art as essentially a packet-switched network based on the family of protocols called Transmission Control Protocol/Internet Protocol (TCP/IP), a family of networking protocols providing communication across interconnected networks between computers with diverse hardware architectures and between various computer operating systems. Operation of the Internet 50 and the TCP/IP transmission protocols is well known to those skilled in the art.

The server 66 is a computer or collection of computers and associated memory storage. On the Internet 50 or other network, the server 66 may include a computer or software application that responds to commands from a client computer, for example the VSN 56 according to the present invention. A file server may contain an archive of data or program files. When a client computer submits a request for a file to the file server, the file server transfers a copy of the file to the client computer.

In operation, the intelligent network elements of the AIN, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP switches 12 and 14, a relatively small set of triggers are defined at the SSP switches for each call.

The message created by an SSP in response to the "firing" of a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. Query messages, conversation messages, and response messages are standard types of messages defined by the AIN protocol. The details of the AIN protocol are well known to those skilled in the art and will not be further described herein. For more information regarding the AIN protocol, see Bellcore Specification GR-1298-CORE Switching Systems Generic Requirements for AIN 0.1, which is incorporated herein by reference.

The wireless network 51, such as a cellular network, comprises a mobile switching center (MSC) 52, 57. The MSC 52 is a switch providing services and coordination between wireless users in the network 51 and external networks. The MSC 52 may be connected to the STP 34 to provide information to the wireline network and receive information from the wireline network. The MSC 52 also communicates with a wireless subscriber, such as wireless telephones 53.

Operation

Figure 3:
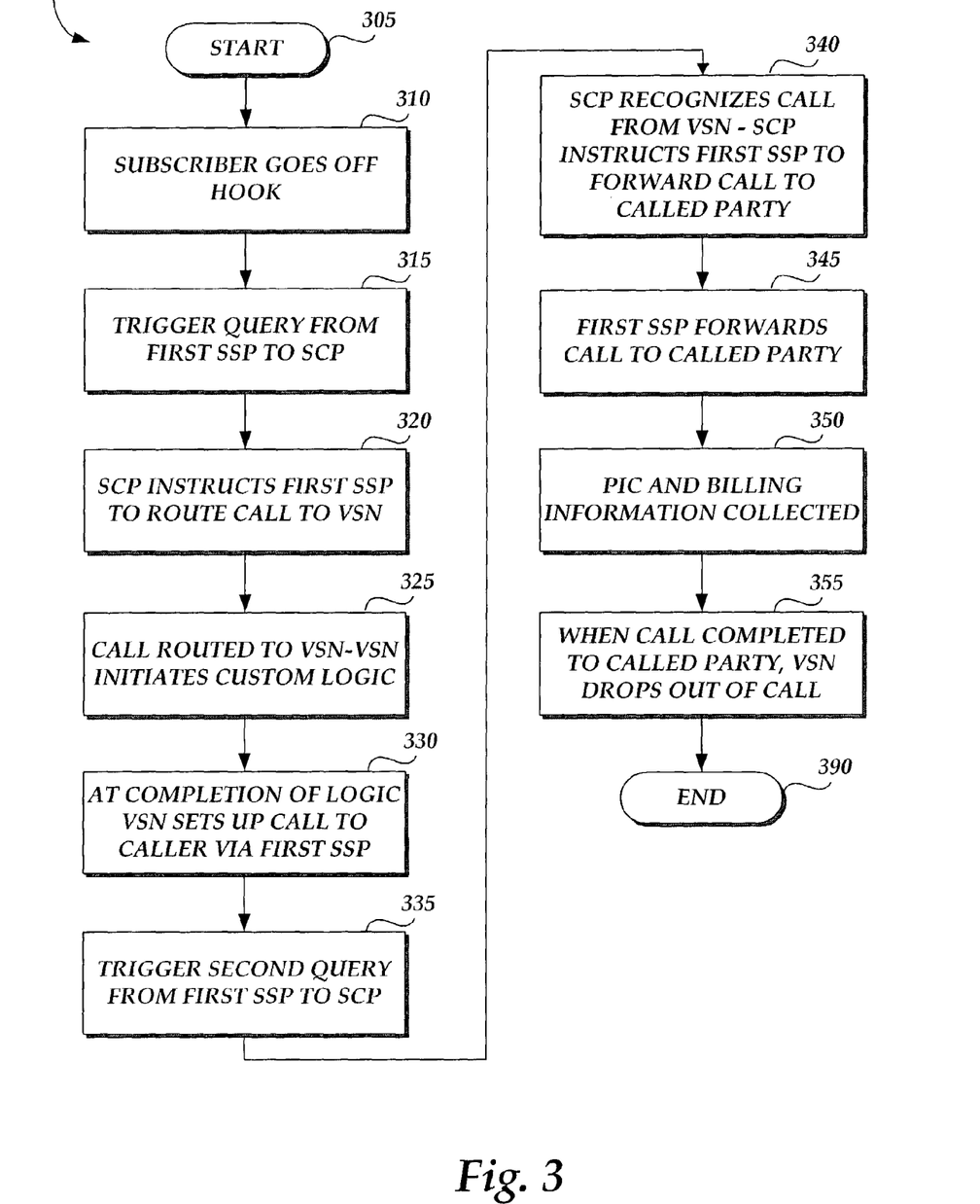
FIG. 3 illustrates a logical call flow of steps performed by a method and system of the present invention for utilization of a voice services node in general call processing.

FIG. 3 illustrates a logical call flow of steps performed by a method and system of the present invention for utilization of a voice services node 56 in general call processing. According to embodiments of the present invention, the voice services node 56 is utilized to facilitate voice interaction between a subscriber and components of the subscriber's telecommunications network and for providing other processing including database lookup and general call processing. For purposes of description, and by way of example only, FIG. 3 is described with reference to call processing steps associated with a voice activated dialing system where a subscriber may connect to a voice services node 56, speak the name of a desired called party and receive assistance from the voice services node 56 in locating a directory number associated with the desired called party and for processing a call between the subscriber and the called party. As should be understood by those skilled in the art, a number of other services may be provided by interaction between a subscriber and the voice services node 56, as described herein with reference to embodiments of the present invention.

Referring then to FIG. 3, the method 300 begins at start step 305 and proceeds to step 310 where a subscriber initiates contact with a voice services node 56 to obtain the services of the voice services node 56 in assisting the subscriber with some type of call processing, for example voice activated dialing, or some other telecommunications service available to the subscriber, for example directory assistance services. At step 310, the subscriber may initiate contact with the voice services node in a variety of manners. According to one embodiment, an off-hook delay trigger may be provisioned at the subscriber's SSP 12 so that when the subscriber takes her telephone set 21 into an off-hook configuration, the off-hook delay trigger provisioned at the SSP 12 triggers (fires) a query for initiating an interactive session with the voice services node 56. Alternatively, at step 310, the subscriber may dial using her telephone 21 a specialized dialing code associated with the desired service. For example, if voice activated dialing is desired by the subscriber, the subscriber may dial a service code, for example "*11," that will be received by the subscriber's SSP 12 which will in turn cause a query to be triggered (fired) from the SSP 12 to initiate an interactive voice session with the voice services node 56.

At step 315, a trigger provisioned at the subscriber's SSP 12 is fired causing a query to the service control point 42 for routing and processing instructions associated with the call. At step 320, the service control point 42 recognizes the query as being associated with the requested service, for example voice activated dialing service, and the service control point 42 instructs the subscriber's SSP 12 to route the call from the subscriber to the voice services node 56. At step 325, the call is received by the voice services node 56, and the voice services node 56 initiates custom logic associated with the requested service. For example, if the requested service is voice activated dialing, the voice services node 56 may provide an audio prompt to the caller such as "Who would you like to call?" Following with the present example, the subscriber (calling party) may respond with a name such as "John Doe," and the voice services node 56 converts the responsive name provided by the subscriber to a digital file using a speech recognition software module resident at the voice services node 56.

The name provided by the subscriber, "John Doe," is used by the voice services node 56 to parse an address book 75 associated with the subscriber or calling party to determine whether a directory number has been stored for the requested name. The voice services node 56 may utilize a calling line identification number associated with the telephone line from which the subscriber has called for matching the subscriber to the subscriber's personal address book 75. Alternatively, the subscriber may be required by the voice services node 56 to enter or speak a user ID and personal identification number.

If the voice services node 56 obtains a directory number associated with the requested name, call processing continues to step 330. Once processing by the voice services node according to the calling feature, for example voice activated dialing, is completed by the voice services node 56, the method continues to step 330, and the voice services node sets up a call to the subscriber via the subscriber's SSP switch 12. According to the example described herein, the voice services node 56 sets up a call ultimately between the subscriber (calling party) and the desired called party via the directory number obtained for the desired called party name.

At step 335, a trigger provisioned at the caller's switch 12 is fired by the call from the voice services node 56 back to the subscriber at the subscriber's switch 12. According to one embodiment of the present invention, the trigger provisioned at the switch 12 is a termination attempt (TAT) trigger. At step 335, the trigger fired at the SSP 12 by the call from the voice services node 56 launches a second query to the service control point 42. At step 340, the service control point 42 recognizes the call from the voice services node 56, and the service control point 42 instructs the SSP 12 to forward the call from the voice services node 56 to the called party using the directory number obtained for the called party by the voice services node 56. At step 345, the SSP 12 forwards the call from the voice services node 56 to the called party at the called party's telephone 24 through the called party's switch 14 via the public switched telephone network 31. As should be understood by those skilled in the art, at this point, a three-way communication is established between the subscriber, the voice services node 56 and the called party. At step 350, billing information, associated with the call may be collected. At step 355, when the call is completed between the subscriber and the called party, the voice services node 56 drops itself from the call leaving the subscriber in communication with the called party.

Accordingly, the voice services node 56 facilitates a voice activated dialing session where the subscriber is required to only speak the name of the party to whom she would like to be connected, and the voice services node 56 facilitates the connection by setting up a call between the subscriber and the desired called party followed by the voice services node 56 dropping itself from the call. The method ends at step 390. As should be understood, the foregoing description of FIG. 3 is described with reference to a voice activated dialing service by way of example only to illustrate the interaction between a subscriber and the voice services node 56 and to illustrate some of the capabilities of the voice services node 56 for causing call routing and to facilitate specialized services required by the subscriber.

Additional specialized features and call processing functionality provided via interaction between a subscriber and a voice services node 56 is described below with reference to FIG. 4. For further description of methods and systems for accessing and obtaining functionality from a voice services nodes 56, see U.S. patent application Ser. No. 10/029,549, filed Dec. 21, 2001, entitled "Method and System of Call Orientation Using a Service Circuit Node in an Advanced Intelligent Network" and U.S. patent application Ser. No. 10/033,627, filed Dec. 27, 2001, entitled "Method and System of Voice Activated Dialing Using an Intelligent Peripheral in Advanced Intelligent Network" both applications of which are incorporated herein by reference as if fully set out herein. Additionally, routing of calls from a subscriber or calling party to and from a voice services node 56, as described above with reference to FIG. 3 may be performed according to standard advanced intelligent network procedures and protocols which are well known to those skilled in the art.

Figure 4:
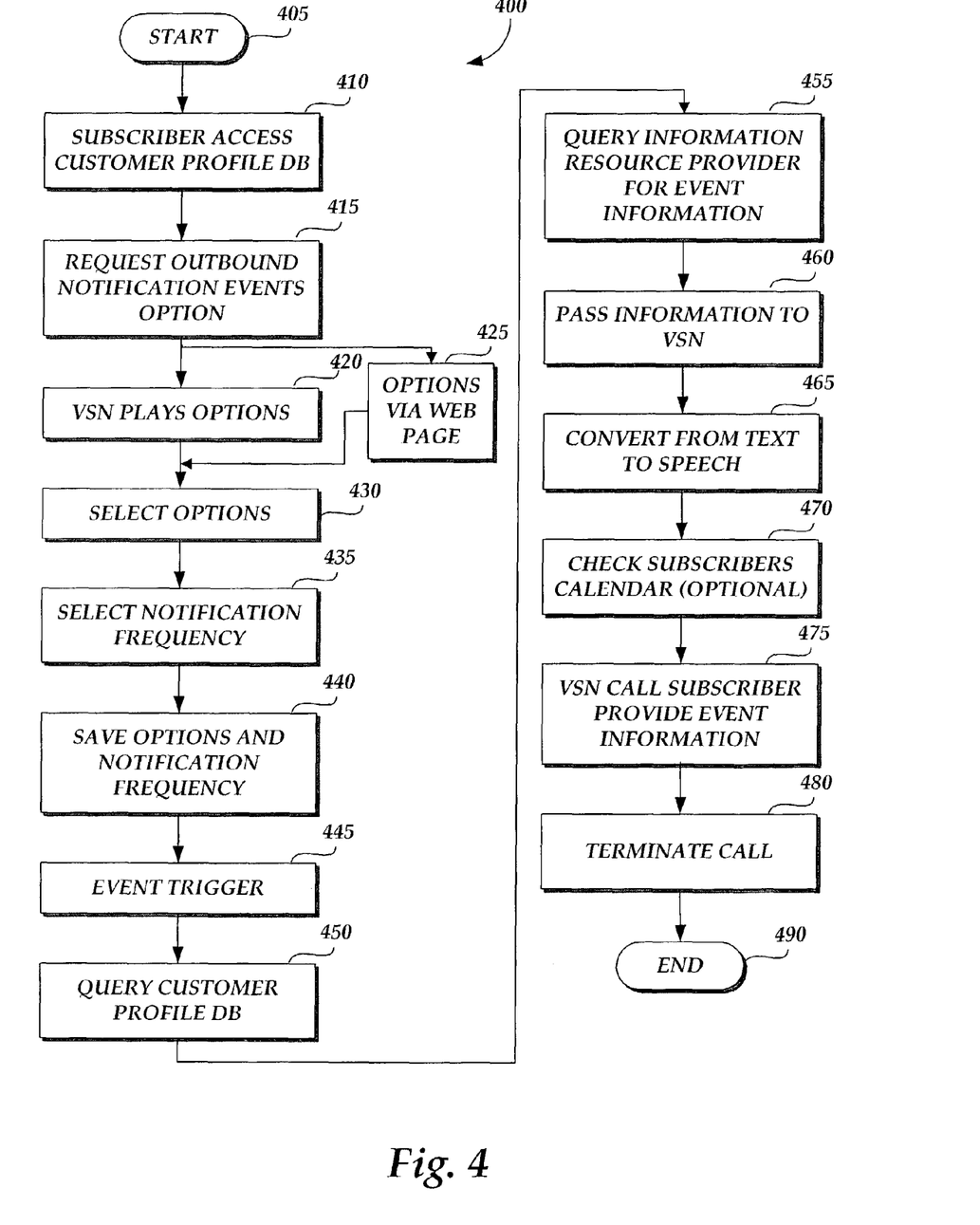
FIG. 4 illustrates a logical call flow of the steps performed by a method and system of the present invention for providing automatic outbound information notification to a subscriber based on a subscriber's communications customer profile.

FIG. 4 illustrates a logical call flow of the steps performed by a method and system of the present invention for providing automatic outbound information notification to a subscriber based on a subscriber's communications customer profile. According to embodiments of the present invention, a subscriber may select certain types of information, for example traffic and weather information, news and sports headlines, financial information, and the like, that may be transmitted to the subscriber on a periodic basis designated by the subscriber via a telephone call placed by a voice services node 56 to the subscriber at a designated telephone directory number.

The method 400 begins at start step 405 and proceeds to step 410 where a subscriber accesses a customer profile database 70 to select information that will be transmitted to the subscriber according to embodiments of the present invention. According to one embodiment of the present invention, the subscriber may contact the customer profile database 70 via the Internet 50 from the subscriber's computer 23. Alternatively, the subscriber may access the customer profile database 70 telephonically through the subscriber's wireline telephone 21, 24 through the public switched telephone network 31 and the voice services node 56. Alternatively, the subscriber may access the customer profile database 70 through a wireless device such as the wireless telephone 53, or wireless computing devices 58, 59 via the wireless network 51. If the subscriber accesses the customer profile database 70 via the Internet 50 and the subscriber's computer 23, the subscriber may be provided an Internet-based web page via the server 66 with which the subscriber may select various information types and frequencies of transmission as desired by the subscriber. At step 415, the subscriber selects outbound notification options. For example, the subscriber may request to receive traffic and weather information for the subscriber's local driving area each work day at 5:00 pm so that the subscriber will have traffic and weather information during the subscriber's drive from his/her place of business to his/her home.

If the subscriber accesses the customer profile database 70 telephonically via the telephone 21, 24 or wireless telephone 53, the voice services node 56 is accessed as described above with reference to FIG. 3. That is, the subscriber switch 12 may be provisioned with a specialized trigger such as an off-hook delay trigger associated with outbound notification updates, or alternatively, the subscriber may be provided with an entry code such as "*12" for accessing the customer profile database 70 via the voice services node, 56, as described above with reference to FIG. 3. At step 420, if the subscriber accesses the customer profile database via the voice services node 56, the subscriber may be provided a prompt such as "Please select the information you wish to be provided from the following list." Subsequently, at step 435 the voice services node may provide a prompt to the subscriber asking the subscriber to designate a frequency date and/or time of day during which outbound notification should be sent to the subscriber. Once all outbound notification information has been selected by the subscriber either via the Internet 50, at step 425, or via the public switched telephone network 31 or wireless network 51, at step 440, the outbound notification options and frequency of transmission selected by the user are saved in the user's customer profile in the customer profile database 70 via a database query or database procedure transmission from the voice services node 56 to the customer profile database 70.

After notification options are selected by the subscriber, the VSN 56 begins tracking on a date and time basis for event occurrences selected by the subscriber. At step 445, when an event triggers for which the subscriber requires outbound notification, the method proceeds to step 450, and the voice services node 56 queries the customer profile database 70 for information regarding the outbound notification that must be sent to the subscriber at the current date and time. That is, at the voice services node 56, a flag is set for each date and time at which a selected outbound notification must be transmitted to the subscriber. For example, if the current date and time is Monday at 5:00 pm, and a flag has been set at the voice services node 56 that an outbound notification must be transmitted at this date and time slot, an event occurrence is triggered at the voice services node 56 to query the customer profile database 70 for information that must be generated and forwarded to the subscriber.

At step 450, the voice services node 56 generates a database query to the customer profile database 70. When the query is received at the customer profile database, the customer profile associated with the subscriber is parsed to determine what information notification is required for the current date and time period. For example, a determination may be made that at the current date and time, traffic information associated with the subscriber's local driving area must be obtained and transmitted to the subscriber. Or, the subscriber may have designated that stock information associated with a particular company stock symbol should be obtained and transmitted to the subscriber at the present date and time. At step 455, an information resource provider is queried for the information required in response to the event occurrence According to an embodiment of the present invention, the voice services node 56 may include memory to which information is downloaded on a periodic basis, for example weather and traffic information, financial data, news information, and the like.

Accordingly, once the voice services node 56 determines from the customer profile of the subscriber what information must be transmitted to the subscriber, the voice services node 56 may extract that information from memory and transmit that information to the subscriber. Alternatively, the voice services node 56 may query a remote server 66 via the Internet 50 for information responsive to the event trigger. For example, if the requested information includes weather and traffic information for the subscriber's local driving area, a request may be sent to an information clearinghouse via the remote server 66 via the Internet 50 or other distributed computing environment to a traffic/weather service whereby an identification for the subscriber's local driving area, such as a zip code, may be entered to obtain data associated with the traffic and weather conditions for the designated area. According to another example, the voice services node may request stock information from a financial information source located on a remote server 66 via a distributed computing environment such as the Internet 50 for a designated company stock symbol requested by the subscriber. At step 460, information requested by the voice services node 56 from a remote server 66 or from a memory storage area at the voice services node 56 populated with data on a periodic basis is passed to the voice services node 56 for transmission to the subscriber. At step 465, the data obtained by the voice services node 56 is converted from text-to-speech. Alternatively, the information may have been obtained by the voice services node 56 previously formatted into a digital audio file such as a WAV file.

At step 470, according to an alternative embodiment of the present invention, the voice services node 56 may query the customer profile database 70 to determine whether the subscriber has populated his customer profile with personal calendaring and scheduling information that may provide an alternate telephone directory number for reaching the subscriber with the requested outbound information notification. For example, if the subscriber may be reached at the subscriber's wireless telephone 53 instead of the subscriber's wireline telephone 21 at the current date and time according to the subscriber's personal calendaring and scheduling information contained in the customer profile database 70, the voice services node 56 may determine that the outbound notification should be sent to the alternate telephone directory number as opposed to a previously designated telephone directory number for the subscriber. Alternatively, the information obtained by the voice services node 56 may be sent to an alternative device such as a computer 23 or a hand-held electronics device such as a personal digital assistant 58. For further description of obtaining an alternate telephone directory number for transmitting the outbound notification to the subscriber, see U.S. patent application Ser. No. 10/393,055, filed Mar. 20, 2003, now U.S. Pat. No. 7,167,547 entitled "Personal Calendaring, Scheduling and Notification Using Directory Assistance Data," assigned to the same assignee as the present invention which is incorporated herein by reference as if fully set out herein.

At step 475, the voice services node 56 places a call to the subscriber as described above with reference to FIG. 3. As should be understood, the voice services node 56 may call the subscriber at a previously designated primary telephone directory number, or the voice services node 56 may place a call to the subscriber at an alternate telephone directory number or electronic mail address obtained by the voice services node 56, as described above with reference to step 470. When the subscriber answers the call from the voice services node 56, the text-to-speech or digital audio file is played to the subscriber to provide the subscriber the requested outbound information notification. Once the transfer of information from the voice services node 56 to the subscriber is complete, the method proceeds to step 480, and the call is terminated by the voice services node 56. Alternatively, after the audio message is played to the subscriber, a variety of other options may be provided to the subscriber to allow the subscriber to make use of other telecommunications services available to the subscriber. The method ends at step 490.

As described herein, methods and systems are described for providing automatic outbound information notification to a subscriber based on a subscriber's communications customer profile. It will be apparent to those skilled in the art that various modifications and variations may be made in the present invention without departing from the scope or spirit of the invention. Other embodiments of the invention will be apparent to those skilled in the art from consideration of the specification and practice of the invention disclosed herein.

We claim:

1. A method of providing an outbound information notification to a communications system subscriber, comprising:
    at a first communications network component, converting a list of outbound information notification options from text to speech for playing as an audio message, providing the audio message to provide a subscriber the list of outbound information notification options, said options comprising a list of information types that are available to the subscriber, and receiving a selection of one or more outbound information notification options, receiving a selection of a designated day and time for outbound information notification, and saving the selected one or more outbound information notification options and the designated day and time to a customer profile;
    at the first communications network component, tracking the subscriber designated day and time;
    at an occurrence of the subscriber designated day and time, perform the following:
        determining information to be provided to the subscriber and determining a destination in accordance with a personal calendar and schedule of the subscriber;
        receiving at the first network component an identification associated with the information that is determined to be provided to the subscriber;
        at the first network component, retrieving the information associated with the identification that is determined to be provided to the subscriber; and
        sending only to the subscriber the outbound information notification including the information associated with the identification in a predetermined manner to the determined destination designated by the subscriber at the subscriber designated day and time.

2. The method of claim 1, wherein sending the outbound information notification comprises placing a call to the subscriber and playing the information as an audio.

3. The method of claim 1, further comprising querying a customer profile database for the customer profile of the subscriber, wherein the customer profile has been populated with personal calendaring and scheduling information of the subscriber.

4. The method of claim 3, wherein after querying the customer profile database, parsing the customer profile of the subscriber to determine what information is to be provided to the subscriber at the designated day and time.

5. The method of claim 1, further comprising converting the information from text to speech for transmitting to the subscriber via a text-to-speech translation.

6. The method of claim 1, wherein retrieving the information that is to be provided to the subscriber includes retrieving the information as a prerecorded audio file.

7. The method of claim 1, wherein retrieving the information includes parsing a memory storage medium populated with the information.

8. The method of claim 1, wherein retrieving the information comprises:
    sending a database query to a remote storage medium from the first network component; and
    at the remote storage medium, retrieving the information.

9. The method of claim 8, wherein sending a database query to the remote storage medium includes sending the database query from the first network component to a remote information clearinghouse via a distributed computing network.

10. The method of claim 9, wherein sending a database query from the first network component to a remote information clearinghouse includes sending the database query via the Internet.

11. The method of claim 10, wherein sending the database query via the Internet comprises sending the database query via a TCP/IP communications protocol.

12. The method of claim 1, further comprising playing a prerecorded audio message including the list of outbound information notification options to the subscriber.

13. The method of claim 1, wherein receiving a selection of one or more outbound information notification options from the list of outbound information notification options includes receiving a selection of one or more subscriber defined event occurrences at which information associated with the subscriber defined event occurrence is to be provided to the subscriber.

14. The method of claim 13, further comprising receiving from the subscriber a frequency with which the outbound information notification is to be sent to the subscriber wherein the frequency comprises the subscriber designated day and time.

15. The method of claim 1, wherein saving the selected one or more outbound information notification options to a customer profile of the subscriber includes saving the selected one or more outbound information notification options to the customer profile for the subscriber in a customer profile database.

16. The method of claim 15, further comprising saving the identification associated with the information that is to be provided to the subscriber at the subscriber designated day and time.

17. The method of claim 1, wherein receiving from the subscriber a request for options for providing outbound information notification includes receiving the request from the subscriber via a distributed computing network.

18. The method of claim 17, wherein receiving from the subscriber via a distributed computing network a request for options for outbound information notification includes receiving the request from the subscriber via the Internet.

19. The method of claim 18, wherein receiving from the subscriber via a distributed computing network a request for options for outbound information notification includes receiving the request from the subscriber via a TCP/IP protocol connection from a subscriber computing device to the first network component.

20. The method of claim 1 wherein the information associated with the identification includes traffic information for the subscriber's local driving area.

21. The method of claim 1 wherein the information associated with the identification includes weather information of the subscriber's local driving area.

22. The method of claim 1 wherein the information associated with the identification includes financial information designated by the subscriber.

23. The method of claim 1 wherein the information associated with the identification includes news information designated by the subscriber.

24. A voice services node for providing an outbound information notification to a communications system subscriber, comprising:
means for converting a list of outbound information notification options from text to speech for playing as an audio message;
means for providing the audio message to provide the list of outbound information notification options;
means for tracking one or more days and times defined by a subscriber for providing outbound information notification from a first communication network component to a subscriber;
means for determining information that is to be provided to the subscriber upon an occurrence of the days and times defined by the subscriber for providing the outbound information notification wherein the occurrence of the outbound information event defined by the subscriber for providing outbound information notification comprises the subscriber designated day, time, and destination in accordance with a personal calendar and schedule of the subscriber;
means for determining the destination that is in accordance with the personal calendar and schedule of the subscriber;
means for retrieving, at the occurrence of the days and times, defined by the subscriber the information that is determined to be provided to the subscriber upon the occurrence of outbound information event having the subscriber designated time; and
means for sending only to the subscriber the outbound information notification including the information that is determined to be provided to the subscriber in a predetermined manner whenever the designated time occurs, wherein the outbound information notification is sent to the determined destination that is in accordance with the personal calendar and schedule of the subscriber.

25. The voice services node of claim 24, wherein the means for sending the outbound information notification comprises means for placing a call to the subscriber and playing the information as an audio.

26. The voice services node of claim 24, wherein the voice services node is further operative to query a customer profile database for a customer profile for the subscriber for determining information to be provided to the subscriber, wherein the customer profile has been populated with personal calendaring and scheduling information of the subscriber.

27. The voice services node of claim 24, wherein the voice services node is further operative to convert the information from text-to-speech for providing to the subscriber as an audio message.

28. The voice services node of claim 24, wherein the voice services node is further operative to parse a storage medium populated with the information.

29. The voice services node of claim 28, wherein the voice services node is further operative:
to send a database query to the storage medium; and
to retrieve the information from the storage medium.

30. The voice services node of claim 29, wherein the voice services node is operative to send the database query to a remote information resource provider via a distributed computing network.

31. The voice services node of claim 30, wherein the voice services node is operative to send the database query to the remote information resource provider via the Internet.

32. The voice services node of claim 24, wherein, prior to tracking one or more outbound information events defined by a subscriber for providing outbound information notification to a subscriber, the voice services node is further comprises:
means for receiving a call from a subscriber for voice interactive services;
means for receiving from the subscriber a request for options for outbound information notification;
means for receiving a selection of one or more outbound information notification options from the list of outbound information notification options for providing outbound information to the subscriber; and
means for saving the selected one or more outbound information notification options to a customer profile for the subscriber.

33. The voice services node of claim 24, wherein the outbound information event defined by a subscriber for providing outbound information notification includes a date for outbound notification of the information associated with the selected event occurrence.

34. The voice services node of claim 24, wherein the information includes traffic information for the subscriber's local driving area.

35. The voice services node of claim 24, wherein the information includes weather information of the subscriber's local driving area.

36. The voice services node of claim 24, wherein the information includes financial information designated by the subscriber.

37. The voice services node of claim 24, wherein the information includes news information designated by the subscriber.

38. A method of providing an outbound information notification to a communications system subscriber, comprising:
converting a list of outbound information notification options from text to speech for playing as an audio message;
providing the audio message to provide the list of outbound information notification options;
at a voice services node, tracking one or more times and days designated by a subscriber for an outbound information event occurrence defined by the subscriber for providing outbound information notification to the subscriber;
at an occurrence of a subscriber-designated day and time, perform the following:
querying a customer profile database that has been populated with personal calendaring and scheduling information of the subscriber for a customer profile for the subscriber for determining information to be provided to the subscriber at the occurrence of the selected day and determining a destination that is in accordance with a personal calendar and schedule of the subscriber;
receiving, at the voice services node from the customer profile database, identification of the information that is determined to be provided to the subscriber at the occurrence of the subscriber designated day and time;
at the voice services node, retrieving the information that is determined to be provided to the subscriber; and
from the voice services node, sending outbound information notification only to the subscriber in a predetermined manner to the destination in accordance with the personal calendar and schedule of the subscriber at the subscriber designated day and time.

39. The method of claim 38, wherein retrieving the information includes parsing a remote storage medium populated with the information.

40. The method of claim 39, wherein retrieving the information farther comprises:
sending a database query to the remote storage medium from the voice services node; and
at the remote storage medium, retrieving the information.

41. The method of claim 40, wherein sending a database query to the remote storage medium includes sending the database query from the voice services node to a remote information resource provider at a remote server via the Internet.

42. The method of claim 1, wherein sending the outbound notification comprises:
placing a call from the first network component to the subscriber at a designated subscriber telephone directory number; and
playing the information as an audio message to the subscriber.

43. The method of claim 1, further comprising setting a flag at the first network component for the designated day and time at which the outbound information notification is to be sent to the subscriber, wherein sending an outbound information notification comprises sending notification via at least one of the following:
voice over Internet protocol;
voice/audio;
electronic mail; and
SMS.

44. The method of claim 1, wherein sending an outbound information notification comprises sending notification via at least one of the following:
telephone;
personal computer;
wireless device; and
PDA.

45. The method of claim 38, wherein sending a outbound information notification comprises:
placing a call from voice services node to the subscriber at a designated subscriber telephone directory number;
providing the information to the subscriber telephonically; and
terminating the call to the subscriber.

46. A computer program product comprising a computer-readable medium having control logic stored therein for causing a computer to provide an outbound information notification to a communications system subscriber in accordance with a personal calendar and schedule of the subscriber, wherein the computer-readable medium is non-transitory, the control logic comprising computer readable program code for causing the computer to:
converting a list of outbound information notification options from text to speech for playing as an audio message;
providing the audio message to provide the list of outbound information notification options;
at a first communications network component, track a day and time designated by a subscriber for providing the outbound information notification to the subscriber;
at an occurrence of a subscriber designated day and time, perform the following:
determine information to be provided to the subscriber upon an occurrence of the days and times defined by the subscriber for providing the outbound information notification, wherein the occurrence of the outbound information event defined by the subscriber for providing outbound information notification comprises the subscriber designated day, time, and destination in accordance with a personal calendar and schedule of the subscriber; and
determine a destination in accordance with the personal calendar and schedule of the subscriber;
at the first network component, retrieve the information that is to be provided to the subscriber upon the occurrence of outbound information event having the subscriber designated time; and
send the outbound information notification only to the subscriber to the determined destination that is in accordance with the personal calendar and schedule of the subscriber in a predetermined manner at the subscriber designated day and time, wherein the outbound information notification includes the information determined to be provided to the subscriber.

* * * * *